United States Patent
Ten Tije et al.

[19]

[11] Patent Number: 6,007,759
[45] Date of Patent: Dec. 28, 1999

[54] METHOD FOR MANUFACTURING AN INJECTION MOULDED ARTICLE

[75] Inventors: Gerrit Hendrik Ten Tije, Diepenheim; Johan Hendrik Vreeman, Lochem, both of Netherlands

[73] Assignee: Simco Nederland B.V., Lochem, Netherlands

[21] Appl. No.: 08/823,798

[22] Filed: Mar. 24, 1997

[30] Foreign Application Priority Data

Mar. 25, 1996 [NL] Netherlands ............................ 1002696

[51] Int. Cl.⁶ .............................. B29C 31/08; B29C 45/14
[52] U.S. Cl. .......................... 264/478; 264/480; 264/268; 264/275; 475/129.1; 475/174.8 E
[58] Field of Search ..................................... 264/478, 510, 264/511, 513, 484, 275, 268, 266, 280; 475/174.8 E, 129.1

[56] References Cited

U.S. PATENT DOCUMENTS

| | | |
|---|---|---|
| 3,270,101 | 8/1966 | Jardine et al. . |
| 3,556,514 | 1/1971 | Stockmann ............................... 264/484 |
| 3,559,248 | 2/1971 | Stockmann ............................... 264/484 |
| 4,795,597 | 1/1989 | Whiteley et al. ......................... 264/509 |
| 4,987,332 | 1/1991 | Yamamoto et al. . |
| 5,369,798 | 11/1994 | Mizukoshi et al. ...................... 264/266 |
| 5,442,429 | 8/1995 | Bartholmae et al. .................... 355/273 |
| 5,601,853 | 2/1997 | Bednarz et al. ......................... 264/484 |
| 5,614,146 | 3/1997 | Nakamura et al. ...................... 264/511 |
| 5,742,880 | 4/1998 | Takenaka et al. ....................... 399/176 |
| 5,790,926 | 8/1998 | Mizoe et al. ............................. 399/174 |

FOREIGN PATENT DOCUMENTS

| | | |
|---|---|---|
| 0249363 | 12/1987 | European Pat. Off. . |
| 1557456 | 2/1969 | France . |
| 2009611 | 2/1970 | France . |
| 2122611 | 11/1972 | Germany . |
| 2289317 | 11/1990 | Japan . |

*Primary Examiner*—Jan H. Silbaugh
*Assistant Examiner*—Edmund H. Lee
*Attorney, Agent, or Firm*—Webb Ziesenheim Logsdon Orkin & Hanson, P.C.

[57] ABSTRACT

A method for manufacturing an injection molded article on a surface on which a label is arranged and a device for manufacturing the injection molded article on the surface of which the label is arranged are disclosed. In the disclosed method, an injection mold is provided having two mold halves together defining a mold cavity in a closed situation. The mold cavity has a form that corresponds to a form of the injection molded article. A label is placed in the mold cavity in an open situation. The label is electrostatically charged such that it adheres electrostatically to a wall of the mold cavity. The mold cavity is closed, and a heated and thus plasticized plastic is injected into the closed mold cavity. The mold is opened after cooling and the article is removed from the mold cavity. The disclosed device includes a carrier for carrying and electrically charging the label at the moment it contacts the wall of the open mold cavity. The carrier includes an electrically conductive layer positioned between the carrier and the label and a surface of the label contacts a surface of the electrically conductive layer.

5 Claims, 5 Drawing Sheets

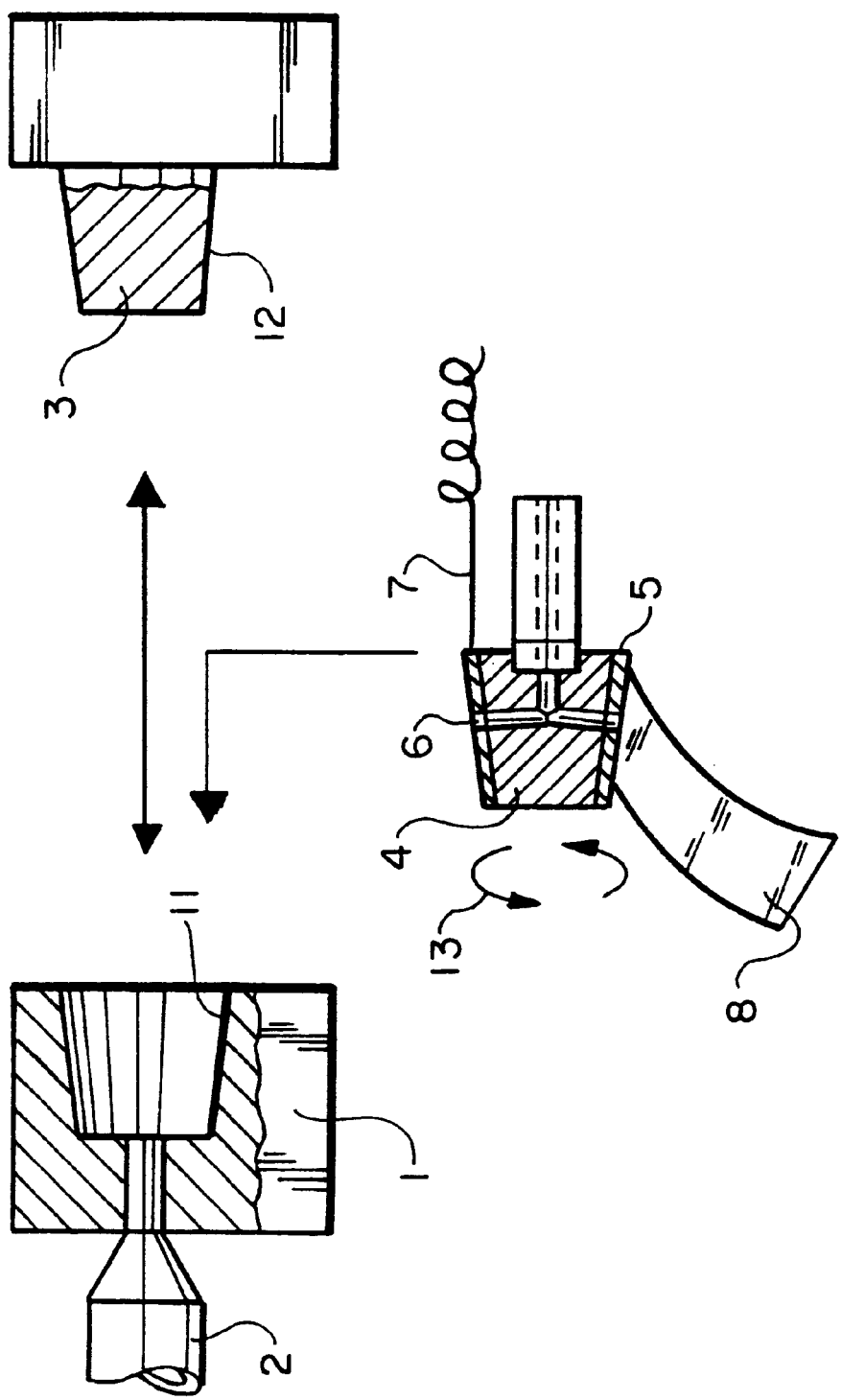

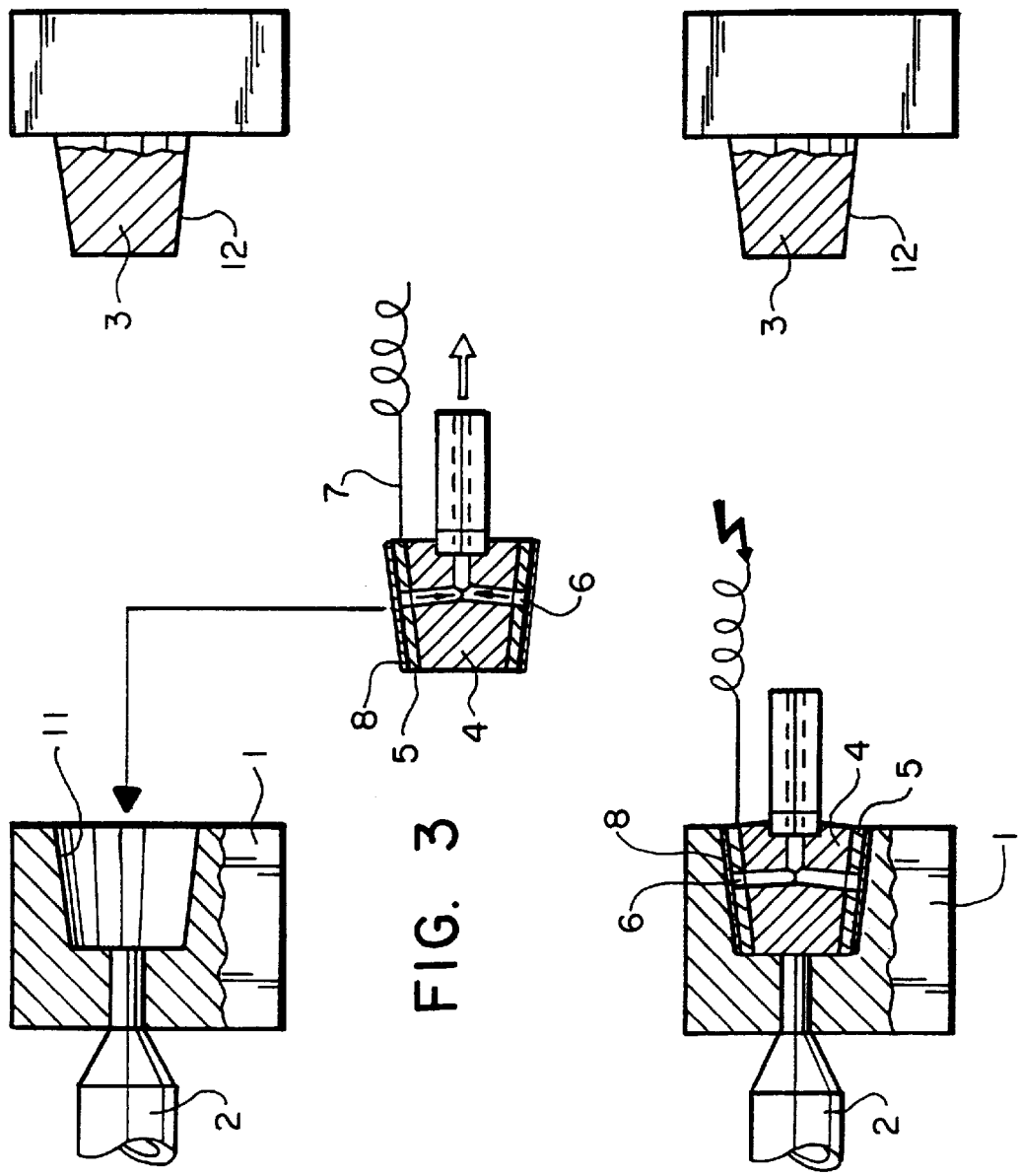

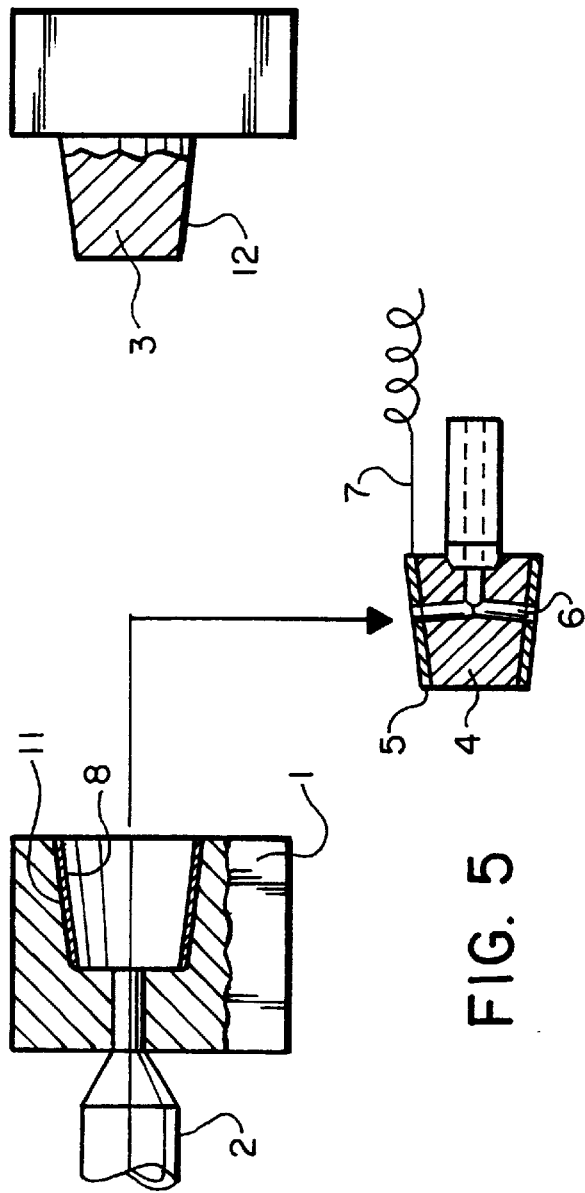
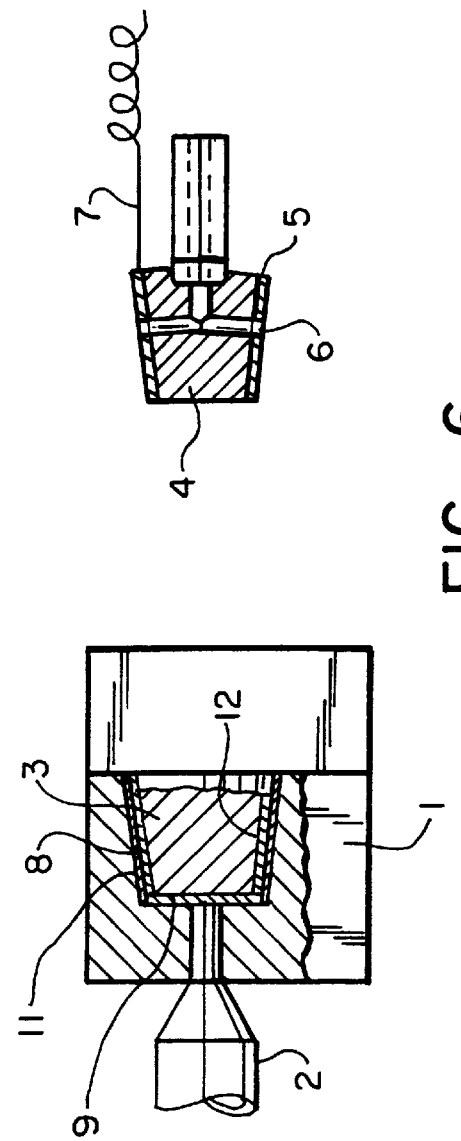
FIG. 5
FIG. 6

METHOD FOR MANUFACTURING AN INJECTION MOULDED ARTICLE

BACKGROUND OF THE INVENTION

The invention provides a method for manufacturing an injection moulded article on a surface of which a label is arranged. The articles in question can for instance be pots, beakers, trays or buckets of any conceivable shape. In order to render unnecessary the subsequent printing of the obtained injection moulded products, labels have heretofore been glued thereto. This after-treatment is made unnecessary by the method according to the invention.

SUMMARY OF THE INVENTION

Accordingly, we have invented a method which comprises the following steps, to be performed in suitable sequence, of:

(a) providing an injection mould having two mould halves together defining a mould cavity in closed situation, the form of which mould cavity corresponds with the form of the injection moulded article for manufacturing;

(b) placing a label in the mould cavity in the opened situation;

(c) electrically charging said label such that it adheres electrostatically to the wall of the mould cavity;

(d) closing the mould;

(e) injecting heated and thus plasticized plastic into the mould cavity; and (f) opening the mould after cooling and therefore curing of the plastic and removing the article from the mould cavity.

The label can, if desired, be placed by hand in the opened mould cavity. After arranging of the label against the wall of the mould cavity a treatment takes place such that the label is electrically charged and thus adheres with force against the surface. This adhesion ensures that the label can no longer shift, while penetration of the plasticized plastic between the label and the mould cavity during the injection moulding is also prevented.

The method according to the invention preferably has the special feature that the label has at least an inner surface of a material which when heated adheres to or fuses homogeneously with the heated plastic, for instance the same material.

In order to prevent damage to information carried by a label the embodiment is recommended in which the inner surface of the label comprises an information-carrying layer which is covered by a light-transmitting, for instance transparent, layer.

A specific embodiment has the special feature that step (b) is performed by causing the label to be carried by a mandrel which comprises an electrically conducting layer at least in the region where the label has to be carried, whereafter an electrostatic charge is applied to the label at or at about the moment when the label contacts the wall of the mould cavity. The mandrel can be embodied such that it forms part of robot means and can remove the label from a magazine, for instance by means of suction cups, and place it in the mould cavity.

This latter described embodiment preferably has the special feature that the electrically conducting layer consists of flexible material, for instance foam material.

A specific embodiment has the feature that the charge is applied to the electrically conducting layer. In this embodiment the charge transfer takes place directly.

Another embodiment has the special feature that the charge is applied to the mandrel. The charge transfer herein takes place indirectly.

The method preferably has the special feature that step (b) takes place with automatic means. The mandrel is supported in this embodiment by a robot or a mechanically controlled arm.

Particularly the embodiment in which use is made of an electrically conducting layer carried by a mandrel can have the special feature that the voltage has a value of a maximum of about 30 kV. This voltage can be lower than is the case for instance in the use of point electrodes because the charge is applied over the whole surface of the material and ionization of the air is unnecessary.

With the use of an electrically conducting layer as specified above, the method can have the special feature that the electrically conducting layer has a specific resistance of $10^3$–$10^{12}$ Ohm. The electrically conducting layer can consist of impregnated polyurethane foam.

The invention further relates to a device for manufacturing an injection moulded article on a surface of which a label is arranged by applying the method according to the above given specification, which device comprises:

carrying means for carrying and electrically charging a label at the moment it contacts the wall of an opened mould cavity of an injection mould.

Finally, the invention relates to an article obtained by applying a method according to the invention.

The general advantages of the method according to the invention can be summarized as follows.

1. The products do not have to be stored for later printing. Less storage space is hereby required and the space for the labels can be sufficient.
2. Production can be more flexible because for a different decoration only the labels have to be replaced.
3. Products can be placed in the final packaging directly from the injection moulding machine. They are hereby not touched by hand, thus remaining clean. This also avoids the necessity of washing, drying, sterilizing etc. This can considerably speed up throughflow.
4. Because printing no longer has to take place, a corona or flame pre-treatment can be omitted.
5. No printing machines are required. A printing machine is only used to produce the labels which are supplied from outside.
6. No printing ink is required, whereby maintenance of printing machines is unnecessary and fewer personnel are required.
7. Printing of a label can take place on the inside whereby damage is practically precluded. A label can be fused wholly homogeneously with the product whereby a better quality is ensured.
8. In the case where the label is of the same material as the product, the entire article can be recycled.
9. No vacuum ducts are required in the mould for temporary holding of the label. As is known, vacuum ducts have a tendency to become blocked by fouling or by deposited plastic.
10. As a result of the absence of vacuum ducts, no uneven cooling of the mould occurs.
11. Due to the absence of vacuum ducts, no marking of the articles takes place.
12. Due to the absence of vacuum ducts the mould can be less expensive.
13. The method can be applied in any injection mould, also with existing moulds.

14. Other than is the case with normal labels, no glue is used.
15. Switch-over from one decoration to another can take place very rapidly.
16. Nature and shape of the labels can be fully adapted to any requirement.

The use of an electrically conducting layer consisting of foam material can further result in the following advantages compared to the use of point electrodes.

1. Very good, uniform charging, whereby the label lies very tightly against the wall of the mould cavity.
2. Foam material provides the possibility of operating with a lower high voltage in comparison with a point electrode.
3. The electrostatic adhesion of a label when foam material is used takes place more rapidly than when point electrodes are used.
4. No sparking takes place as a result of the internal resistance of the electrically conducting layer, whereby no electromagnetic interference can occur.
5. The use of an electrically conducting foam material layer is simpler and cheaper than use of point electrodes.
6. There is a considerably reduced likelihood of damage to the walls of the mould cavity by the soft foam material.
7. The execution can be simpler and cheaper.

This latter summary shows that the use of particularly a foam material layer or cushion offers great advantages. During arrangement of the label it is pressed on slightly by the mandrel with a correspondingly slight compressing of the elastically compressible foam material layer of electrically conducting material.

The method according to the invention provides a superior contact of a label against even the most strangely or irregularly formed walls of mould cavities.

BRIEF DESCRIPTION OF THE DRAWINGS

The invention will now be elucidated with reference to the annexed drawings. In the drawings FIGS. 1–7 show very schematically respective cross sections through an injection mould and a charging mandrel in the successive stages of manufacture of a beaker-shaped article provided with a label.

DESCRIPTION OF THE PREFERRED EMBODIMENT

Figure 1:
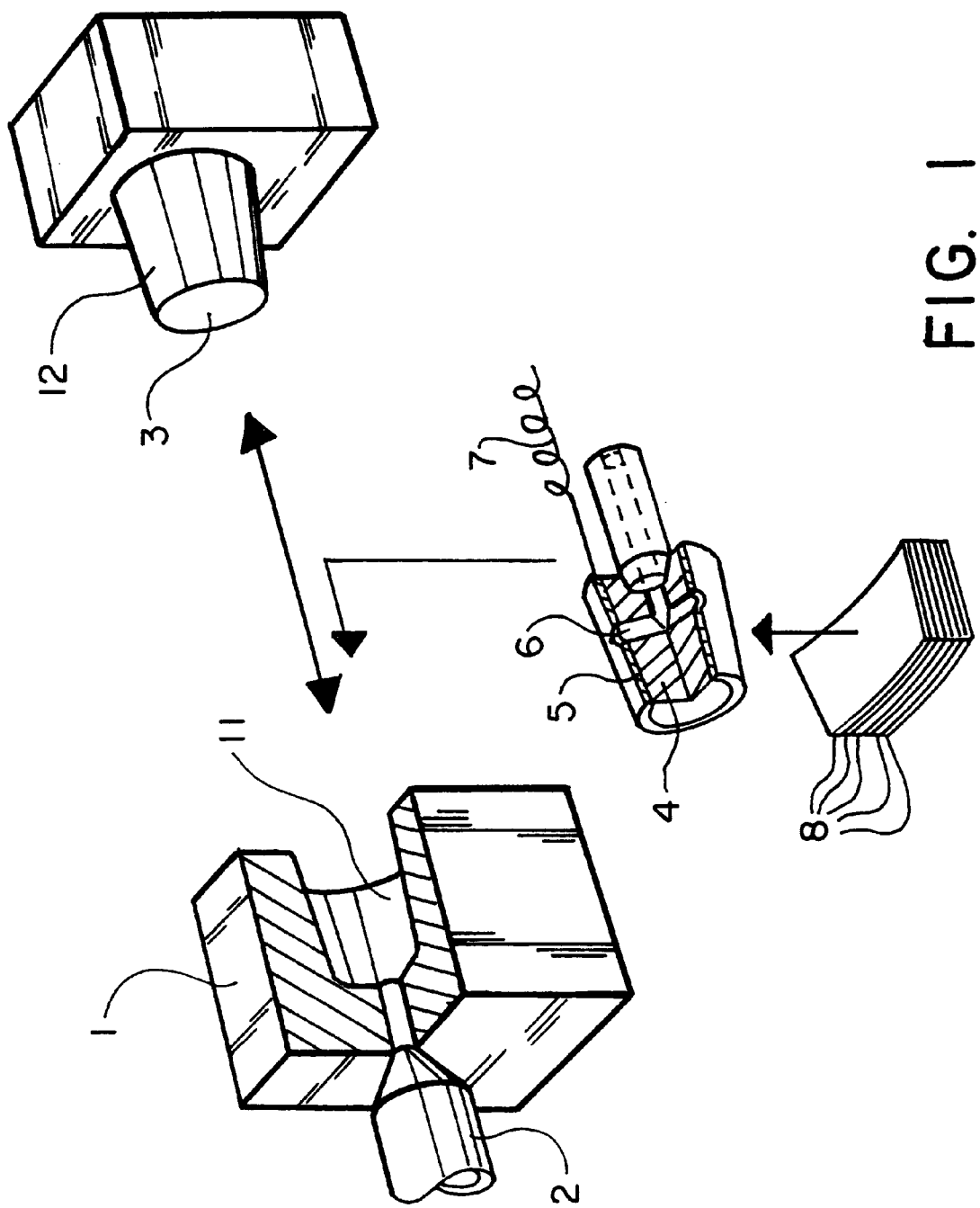

An injection moulding device comprises a first mould half 1 onto which connects an injection nozzle 2 for heated, plasticized plastic, in addition to a second mould half 3, which mould halves 1 and 3 are movable toward and away from each other such that they can bound the mould cavity 9 shown in FIG. 6 in a closed position and in an opened position are remote from each other and are located at a mutual distance.

The device according to the invention further comprises carrying means, such as a mandrel 4, with a conducting lining 5. The relevant outer surface of the mandrel has a shape corresponding with the in this case truncated cone shape of the inner surface 11 of the first mould half 1. Debouching on the jacket surface of mandrel 4 are suction lines 6 which are connectable to the suction mouth (not shown) for temporarily holding successive labels 8.

The outer surface 12 of the second mould half 3 also bounds, together with the inner surface 11 of the first mould half 1, the beaker-shaped mould cavity 9 in the closed situation of mould 1, 3.

FIG. 1 shows the rest position in which the mould is fully opened and the mandrel 4 is also situated in the rest position.

FIG. 2 shows the situation in which a label 8 is added to the mandrel 4 and temporarily held fixedly by suction via suction line 6.

FIG. 3 shows the situation in which the mandrel 4, after performing a rotation 13 through a certain angle, carries with its outer surface a label 8 which must be arranged against the inner surface 11.

FIG. 4 shows the situation in which the mandrel with the label 8 sucked there against is placed in the first mould half 1 such that the elastically compressible conducting lining layer 5 which lines the jacket surface of mandrel 4 presses the label 8 situated on the outside thereof with a certain force against inner surface 11. Via an electric lead 7 connected to a high-voltage supply of for instance 25 kV (not shown) a voltage is applied at that moment to the conducting lining 5. An electrostatic charging of the plastic label 8 thereby takes place, which label thereby undergoes an electrostatic attraction to the inner surface 11. The label 8 hereby comes to lie precisely, without irregularity or folds, against this inner surface 11.

FIG. 5 shows the situation in which mandrel 4 is removed and label 8 lies against inner surface 11 due to said electrostatic force of attraction.

The mould 1, 3 is then closed whereby the situation shown in FIG. 6 is reached in which mould cavity 9 is realized, the label 8 adheres against inner surface 11 under electrostatic attraction and the injection nozzle 2 can inject heated, plasticized plastic into mould cavity 9. The label 8 and the injected plastic are of types which can mutually adhere or fuse homogeneously with each other.

Figure 7:
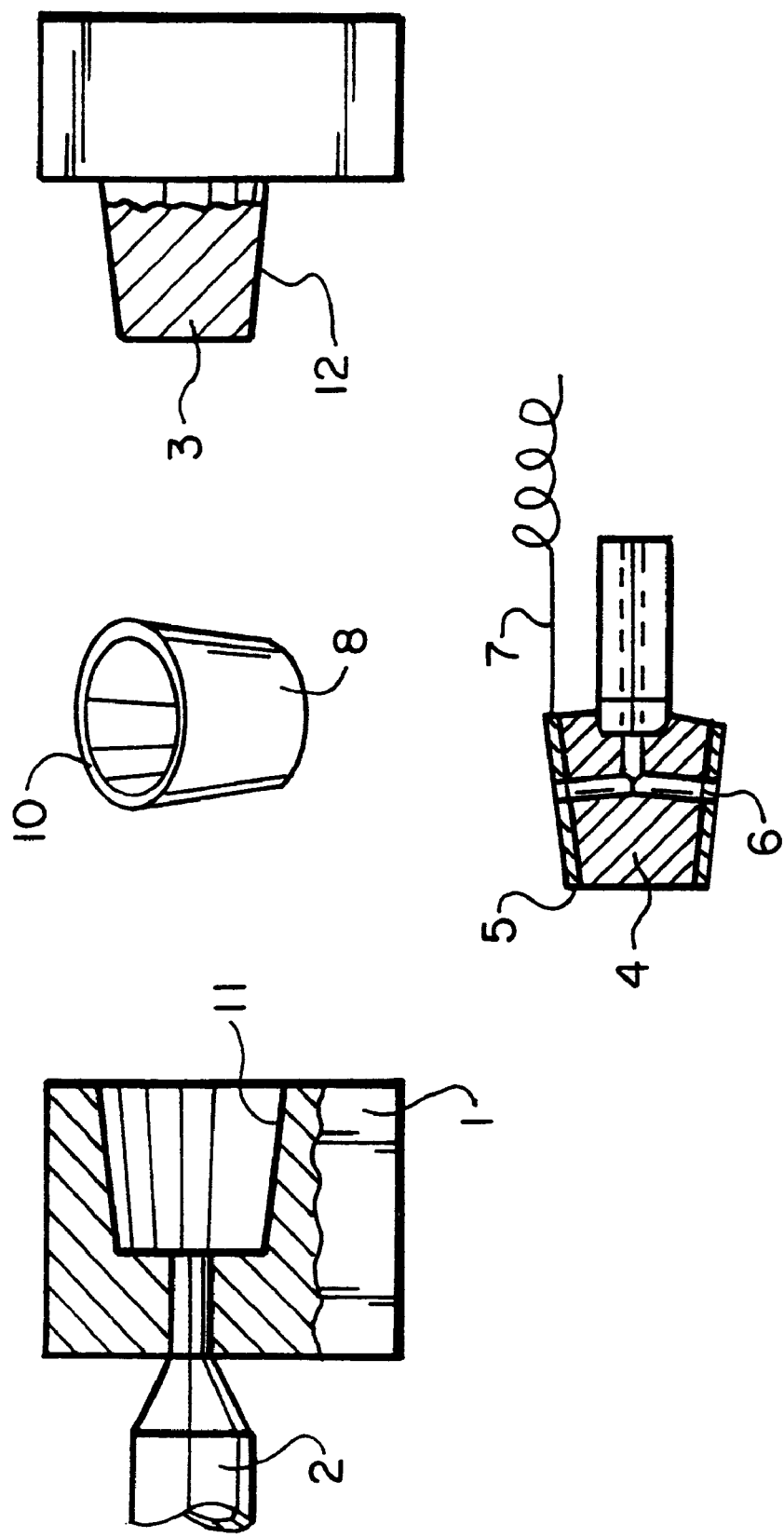

FIG. 7 shows the situation in which after sufficient cooling the thus formed beaker-shaped product 10 is removed from the mould cavity after mould halves 1 and 3 have first been moved apart. The formed product is beaker-shaped and carries the label 8 on its outer surface.

We claim:

1. A method of manufacturing an injection moulded article having a label received on a surface thereof, the method comprising the steps of:

(a) providing a carrying means having a flexible and electrically conducting layer disposed thereon;
   (b) securing a label to a surface of the electrically conducting layer disposed on the carrying means;
   (c) positioning the carrying means with the label secured to the surface of the electrically conducting layer so that the electrically conducting layer urges a surface of the label opposite the electrically conducting layer against a surface of a first mould half;
   (d) applying an electrical potential to one of the carrying means and the electrically conducting layer, with the applied electrical potential electrostatically charging the label so that the label is electrostatically attracted to the surface of the first mould half;
   (e) releasing the label from the surface of the electrically conducting layer;
   (f) positioning the carrying means remote from the first mould half;
   (g) mating the first mould half with a second mould half, with the surface of the first mould half and a surface of the second mould half defining a mould cavity corresponding to the form of the injection moulded article;

(h) injecting heated and plasticized plastic into the mould cavity;

(i) separating the first mould half and the second mould half; and (j) removing the injection moulded article from the mould cavity.

2. The method as claimed in claim 1, wherein the label has at least an inner surface of a material which when heated one of adheres to and fuses homogeneously with the heated plastic.

3. The method as claimed in claim 1, wherein an inner surface of the label comprises an information-carrying layer which is covered by a light-transmitting layer.

4. The method as claimed in claim 1, wherein the label is electrostatically charged with a voltage having a maximum value of about 30 kV.

5. The method as claimed in claim 1, wherein the electrically conducting layer has a specific resistance of $10^3$–$10^{12}$ Ohm.

* * * * *

UNITED STATES PATENT AND TRADEMARK OFFICE
CERTIFICATE OF CORRECTION

PATENT NO. : 6,007,759
DATED : December 28, 1999
INVENTOR(S) : Gerrit Hendrik Ten Tije et al.

Page 1 of 1

It is certified that error appears in the above-identified patent and that said Letters Patent is hereby corrected as shown below:

Title Page:
Before patent number, insert asterisk (*) and insert between Assignee and Application No.:
--[*] Notice: This patent issued on a continued prosecution application filed under 37 CFR 1.53 (d), and is subject to the twenty year patent term provisions of 35 U.S.C. 154 (a) (2) . --.

Signed and Sealed this

Third Day of July, 2001

Attest:

*Attesting Officer*

NICHOLAS P. GODICI
*Acting Director of the United States Patent and Trademark Office*